United States Patent
Yang

(10) Patent No.: US 10,735,839 B2
(45) Date of Patent: *Aug. 4, 2020

(54) LINE CARD CHASSIS, MULTI-CHASSIS CLUSTER ROUTER, AND PACKET PROCESSING

(71) Applicant: New H3C TECHNOLOGIES CO., LTD., Hangzhou (CN)

(72) Inventor: Wu Yang, Beijing (CN)

(73) Assignee: New H3C Technologies Co., Ltd., Hangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/778,458

(22) PCT Filed: Nov. 24, 2016

(86) PCT No.: PCT/CN2016/107053
§ 371 (c)(1),
(2) Date: May 23, 2018

(87) PCT Pub. No.: WO2017/088789
PCT Pub. Date: Jun. 1, 2017

(65) Prior Publication Data
US 2019/0253777 A1    Aug. 15, 2019

(30) Foreign Application Priority Data

Nov. 24, 2015 (CN) .......................... 2015 1 0823203

(51) Int. Cl.
*H04Q 11/00* (2006.01)
*H04Q 11/06* (2006.01)
(Continued)

(52) U.S. Cl.
CPC ...... *H04Q 11/0071* (2013.01); *H04J 14/0267* (2013.01); *H04Q 1/04* (2013.01);
(Continued)

(58) Field of Classification Search
CPC ...... H04J 14/0267; H04L 49/25; H04Q 11/00; H04Q 11/0005; H04Q 11/0066;
(Continued)

(56) References Cited

U.S. PATENT DOCUMENTS 6,796,716 B1 * 9/2004 Handforth ............ G02B 6/3897
385/147
6,934,471 B1 * 8/2005 Carvey .............. H04Q 11/0005
398/45

(Continued)

FOREIGN PATENT DOCUMENTS

| CN | 101098238 A | 1/2008 |
| CN | 101296186 A | 10/2008 |

(Continued)

OTHER PUBLICATIONS

ISA State Intellectual Property Office of the People's Republic of China, International Search Report Issued in Application No. PCT/CN2016/107041, dated Feb. 16, 2017, WIPO, 4 pages.
(Continued)

*Primary Examiner* — Amritbir K Sandhu
(74) *Attorney, Agent, or Firm* — McCoy Russell LLP

(57) ABSTRACT

Disclosed is a line card chassis which includes line card units, optical electrical conversion units and optical fiber interface units. The optical-electrical conversion unit has an onboard optical assembly module used for mutual conversion between an optical signal and an electrical signal; an electrical signal interface of the onboard optical assembly module is connected to the line card unit through an electrical connector, and an optical signal interface of the onboard optical assembly module is connected to the optical fiber interface unit through an optical connector; and the optical fiber interface unit couples the optical signal to a cluster interface of a panel on a router through an optical fiber, and the cluster interface is to concatenate different (Continued)

chassis in the router. Also disclosed is a multi-chassis cluster router and a packet processing method.

16 Claims, 8 Drawing Sheets

(51) Int. Cl.
*H04J 14/02* (2006.01)
*H04Q 1/04* (2006.01)
*H04Q 1/50* (2006.01)
*H04L 12/947* (2013.01)

(52) U.S. Cl.
CPC .............. *H04Q 1/50* (2013.01); *H04Q 11/00* (2013.01); *H04Q 11/0005* (2013.01); *H04Q 11/0066* (2013.01); *H04Q 11/06* (2013.01); *H04L 49/25* (2013.01)

(58) Field of Classification Search
CPC ...... H04Q 11/0071; H04Q 11/06; H04Q 1/04; H04Q 1/50
USPC ...................................... 398/45–58
See application file for complete search history.

(56) References Cited

U.S. PATENT DOCUMENTS

| | | | |
|---|---|---|---|
| 7,106,729 | B1 | 9/2006 | Gullicksen et al. |
| 7,110,394 | B1 | 9/2006 | Chamdani et al. |
| 7,720,061 | B1 | 5/2010 | Krishnaswamy et al. |
| 9,020,356 | B2 | 4/2015 | Xia et al. |
| 9,137,176 | B2 | 9/2015 | Campbell et al. |
| 9,544,667 | B2* | 1/2017 | Hu ..................... H04Q 11/0066 |
| 2004/0052527 | A1* | 3/2004 | Kirby ................ H04Q 11/0005 398/57 |
| 2005/0089027 | A1* | 4/2005 | Colton ............... H04Q 11/0005 370/380 |
| 2005/0259571 | A1 | 11/2005 | Battou |
| 2006/0165070 | A1* | 7/2006 | Hall ...................... H04L 49/101 370/369 |
| 2009/0003327 | A1* | 1/2009 | Zang ....................... H04L 49/15 370/359 |
| 2010/0021166 | A1* | 1/2010 | Way ......................... H04J 14/02 398/79 |
| 2013/0088971 | A1 | 4/2013 | Anantharam et al. |
| 2013/0272643 | A1* | 10/2013 | Traverso .............. G02B 6/4206 385/2 |
| 2014/0247826 | A1 | 9/2014 | Ma |
| 2014/0255022 | A1* | 9/2014 | Zhong ................ H04Q 11/0005 398/16 |
| 2015/0295862 | A1* | 10/2015 | Banerjee ............... H04L 49/602 370/392 |
| 2018/0109348 | A1* | 4/2018 | Salsi ................... H04J 14/0202 |
| 2018/0359194 | A1* | 12/2018 | Yang .................. H04Q 11/0066 |
| 2019/0253777 | A1* | 8/2019 | Yang ................... H04J 14/0267 |

FOREIGN PATENT DOCUMENTS

| | | |
|---|---|---|
| CN | 101631081 A | 1/2010 |
| CN | 101895398 A | 11/2010 |
| CN | 101917337 A | 12/2010 |
| CN | 102217252 A | 10/2011 |
| CN | 102326358 A | 1/2012 |
| CN | 102726058 A | 10/2012 |
| CN | 102907054 A | 1/2013 |
| CN | 103067795 A | 4/2013 |
| EP | 1892905 A1 | 2/2008 |
| EP | 2670082 A1 | 12/2013 |
| JP | H07307962 A | 11/1995 |
| JP | 2003167164 A | 6/2003 |
| JP | 2006279362 A | 10/2006 |
| JP | 2008306555 A | 12/2008 |
| WO | 2006054704 A1 | 5/2006 |

OTHER PUBLICATIONS

European Patent Office, Extended European Search Report Issued in Application No. 16868004.9, dated Oct. 11, 2018, Germany, 8 pages.
European Patent Office, Extended European Search Report Issued in Application No. 16868012.2, dated Oct. 24, 2018, Germany, 6 pages.
ISA State Intellectual Property Office of the People's Republic of China, International Search Report Issued in Application No. PCT/CN2016/107053, dated Feb. 22, 2017, WIPO, 4 pages.
State Intellectual Property Office of the People's Republic of China, Office Action and Search Report Issued in Application No. 201510823203.5, dated Mar. 20, 2019, 15 pages.(Submitted with Partial Translation).
State Intellectual Property Office of the People's Republic of China, Office Action and Search Report Issued in Application No. 201510821616.X, dated Mar. 28, 2019, 14 pages.(Submitted with Partial Translation).
Japanese Patent Office, Office Action Issued in Application No. 2018-526930, dated Apr. 16, 2019, 8 pages. (Submitted with Machine Translation).
ISA State Intellectual Property Office of the People's Republic of China, Written Opinion of the International Searching Authority Issued in Application No. PCT/CN2016/107041, dated Feb. 16, 2017, WIPO, 6 pages.
ISA State Intellectual Property Office of the People's Republic of China, Written Opinion of the International Searching Authority Issued in Application No. PCT/CN2016/107053, dated Feb. 22, 2017, WIPO, 8 pages.
Japanese Patent Office, Office Action Issued in Application No. 2018-543419, dated May 28, 2019, 6 pages. (Submitted with Machine Translation).
State Intellectual Property Office of the People's Republic of China, Office Action and Search Report Issued in Application No. 201510821616.X, dated Sep. 18, 2019, 7 pages.(Submitted with Machine Translation).
State Intellectual Property Office of the People's Republic of China, Office Action and Search Report Issued in Application No. 201510823203.5, dated Nov. 20, 2019, 15 pages.(Submitted with Machine Translation).
United States Patent and Trademark Office, Office Action Issued in U.S. Appl. No. 15/778,396, dated Nov. 25, 2019, 35 pages.
Japanese Patent Office, Office Action Issued in Application No. 2018-526930, dated Nov. 26, 2019, 4 pages. (Submitted with Machine Translation).
European Patent Office, Office Action Issued in Application No. 16868004.9, dated Mar. 25, 2020, Germany, 4 pages.

* cited by examiner

LINE CARD CHASSIS, MULTI-CHASSIS CLUSTER ROUTER, AND PACKET PROCESSING

CROSS-REFERENCE TO RELATED APPLICATIONS

The present application is a U.S. National Phase of International Patent Application Serial No. PCT/CN2016/107053 entitled "LINE CARD FRAME, MULTI-FRAME CLUSTER ROUTER, ROUTING, AND MESSAGE PROCESSING," filed on Nov. 24, 2016. International Patent Application Serial No. PCT/CN2016/107053 claims priority to Chinese Patent Application No. 201510823203.5, filed on Nov. 24, 2015. The entire contents of each of the above-cited applications are hereby incorporated by reference in their entirety for all purposes.

BACKGROUND

A router is a network infrastructure working on Layer 3 of the Open System Interconnection (OSI) protocol model, i.e., a packet switching device on the network layer, and it has abilities to connect different types of networks and select a packet transmission path. With rapid development of the internet, further requirements are raised for the router as the network infrastructure; in many situations, the switching capacity, number of slots and interface capacity of a core router cannot meet the requirements.

DETAILED DESCRIPTION

To make the technique, characteristics, and technical effects of the present disclosure clearer, the present disclosure will be further described hereinafter in combination with detailed embodiments.

A router has a lot of specifications. For example, slot number is the maximum number of line card units (or service processing units) that can be provided by the router; interface capacity is the maximum number of certain ports that can be provided by the router, interface capacity=the number of line card units*the number of ports of each line card unit; and switching capacity is a technical indicator in a switch fabric, and it refers to the maximum throughput capacity in the switch fabric. When the slot number, switching capacity, and interface capacity of a core router cannot meet requirements, especially after it has been just deployed, an operator may hope to flexibly expand the core router. When one router chassis cannot meet the requirements, multiple router chassis may be used to expand the switching capacity and interface capacity, and thus multi-chassis cluster routers are emerging.

Multi-chassis clustering refers to interconnecting single-chassis routers using a concatenating technique to form a new multi-chassis cluster system so as to expand the switching capacity, slot number and interface capacity. A multi-chassis cluster router generally consists of central switch fabric chassis, line card chassis and interconnection optical fibers. In the multi-chassis cluster router, packet switching between the line card chassis is carried out by the central switch fabric chassis.

Figure 1:
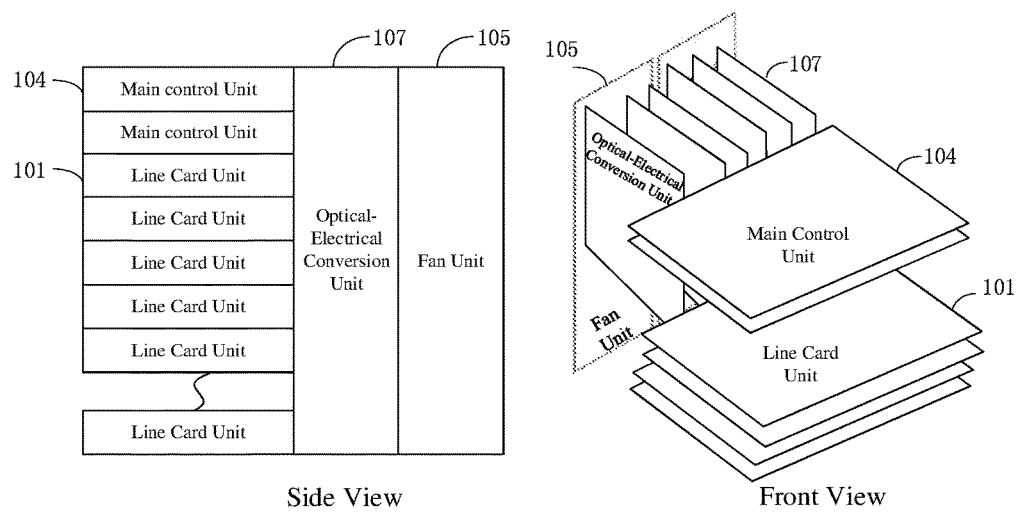
FIG. 1 is a side view and a front view of a line card chassis of a multi-chassis cluster router provided according to examples of the present disclosure.

FIG. 1 is a side view and a front view of a line card chassis of a multi-chassis cluster router provided according to embodiments of the present disclosure. Referring to FIG. 1, the line card chassis of the multi-chassis cluster router provided according to the embodiments of the present disclosure adopts a three-level structure of "main control units 104/line card units 101+optical-electrical conversion units 107+fan units 105", in which multiple units having a same function are parallel to each other and a space occupied by them belongs to a same level. As shown in FIG. 1, each line card unit 101 or main control unit 104 occupies a first-level slot, each optical-electrical conversion unit 107 occupies a second-level slot, and a fan unit 105 occupies a third-level slot. Here, the levels of the slots are only used to distinguish respective parts of the hierarchical structure, and should not be construed as limitation to the present disclosure.

A line card unit 101 and an optical-electrical conversion unit 107 are connected using an orthogonal-without-backboard electrical connection. In this way, without changing the housing height of the router, the switching capacity, slot density, and interface density of a single line card chassis can be improved, and a front-rear air duct is supported. In embodiments of the present disclosure, air inlet holes are provided on panels of the main control units/line card units, so that cold air can enter into the air inlet holes and then pass through the main control units/line card units and the optical-electrical conversion units to form hot air and then hot air is discharged from the fan units. The so called orthogonal-without-back-board electrical connection refers to a connection, in which boards (line card unit and switch fabric unit) are directly connected through a connector without using a printed circuit board, and an angle between the boards is 90 degrees or 270 degrees; it is different from a traditional back-board connection or orthogonal-back-board connection.

If a hardware structure of a traditional line card chassis is used, generally, a panel of a switch fabric unit of the line card chassis cannot provide an optical fiber interface for concatenating, i.e., the line card chassis cannot be concatenated to a central switch fabric chassis using the switch fabric unit; in addition, with increase of the switching capacity and forwarding performance, difficulty in engineering and implementation of simultaneously performing a large capacity of switching and optical-electrical conversion functions at switch fabric unit slots is increased. Therefore, embodiments of the present disclosure provide a corresponding new multi-chassis cluster router.

Figure 2:
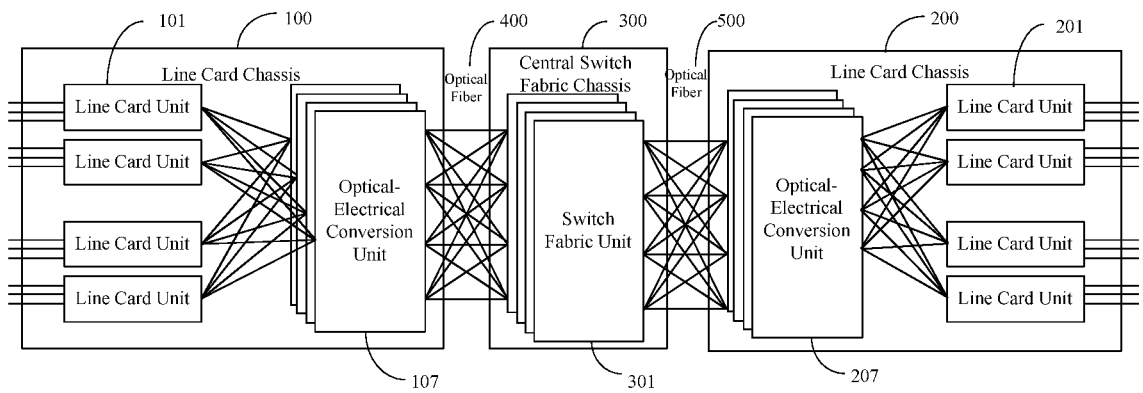
FIG. 2 is a block diagram showing function modules of a multi-chassis cluster router provided according to examples of the present disclosure.

FIG. 2 is a block diagram showing function modules of a multi-chassis cluster router provided according to embodiments of the present disclosure. Referring to FIG. 2, a multi-chassis cluster router consists of a line card chassis 100, a central switch fabric chassis 300 and a line card chassis 200, in which the line card chassis 100 and the central switch fabric chassis 300 are connected through optical fibers 400, and the central switch fabric chassis 300 and the line card chassis 200 are connected through optical fibers 500. The line card chassis 100 includes multiple line card units 101 and multiple optical-electrical conversion units 107; similarly, the line card chassis 200 includes multiple line card units 201 and multiple optical-electrical conversion units 207. Compared to a line card chassis of a traditional cluster router, the line card chassis 100 has no back board unit, switch fabric units are replaced with the optical-electrical conversion units 107, and the optical-electrical conversion units 107 occupy slots where traditional switch fabric units are located. Similarly, the line card chassis 200 has no back board unit, and switch fabric units are replaced with the optical-electrical conversion units 207. The line card chassis 100 adopts a 3-level slot structure, where each line card unit 101 occupies a first-level slot, each optical-electrical conversion unit 107 occupies a second-level slot, and a fan unit 105 occupies a third-level slot; a line card unit 101 and an optical-electrical conversion unit 107 are connected using an orthogonal-without-back-board electrical connection.

In the line card chassis structure of the multi-chassis cluster router provided according to embodiments of the present disclosure, since the switching capacity of the multi-chassis cluster router is very huge, the multi-chassis cluster router still adopts a multi-stage switching structure, but the first-stage, second-stage and third-stage of route selections are carried out by the switch fabric units 301 of the central switch fabric chassis 300. The line card chassis 100 and 200 do not carry out the first-stage and third-stage route selections, and route selections among different line card units in the line card chassis 100 and 200 are carried out by the central switch fabric chassis 300 too.

Figure 3:
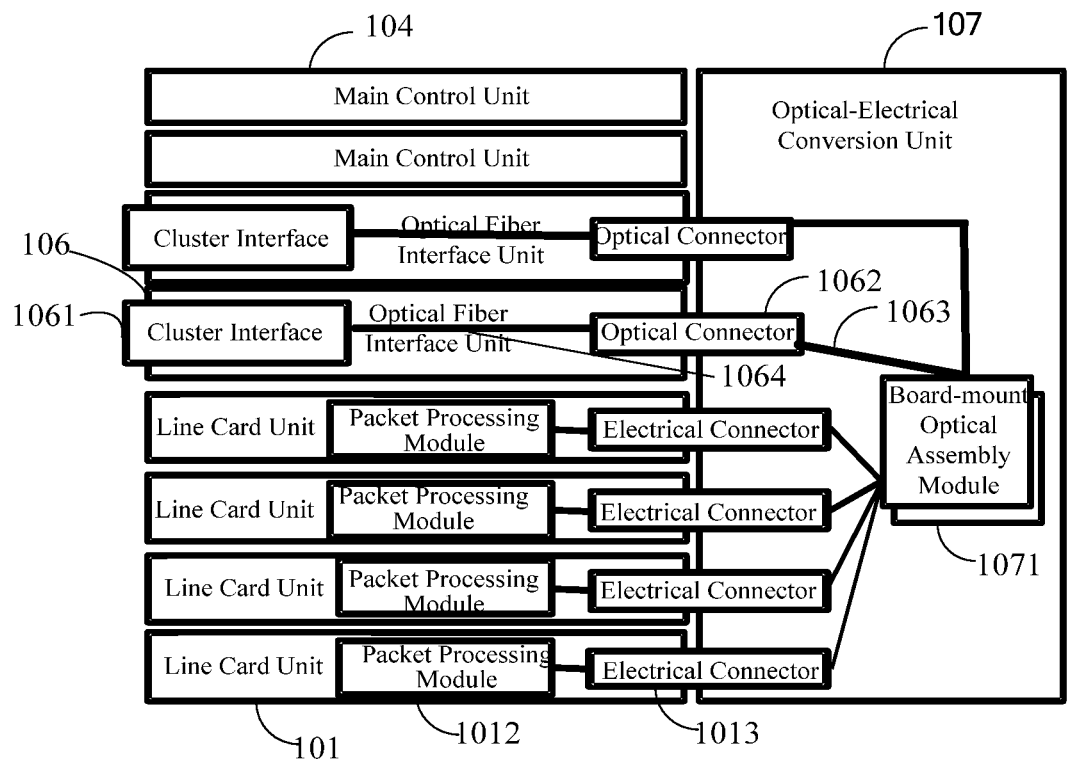
FIG. 3 is a schematic diagram showing how components of a line card chassis are connected provided according to examples of the present disclosure.

FIG. 3 is a schematic diagram showing how components of a line card chassis are connected provided according to embodiments of the present disclosure. As shown in FIG. 3, to be adapted to the mechanism of FIG. 1, the connection relationship inside the line card chassis is improved as follows:

a part of line card unit slots in the line card chassis are modified to optical fiber interface unit slots, i.e., scarifying the part of line card unit slots to realize clustering of the router; an optical fiber interface unit 106 is connected with an optical-electrical conversion unit 107 through an optical connector 1062. Generally, the volume of an optical connector 1062 is smaller than that of an electrical connector 1013, and thus a higher density can be achieved, and the optical fiber interface units 106 only occupy a relatively small slot space; in addition, the connection without a back board enables the electrical connectors 1013 and the optical connectors 1062 to be easily replaced without changing the housing.

The optical-electrical conversion units 107 have onboard optical assembly modules 1071 to carry out conversion between optical signals and electrical signals. An onboard optical assembly module 1071 has an electrical signal interface and an optical signal interface, the electrical signal interface of the onboard optical assembly module 1071 is connected to a line card unit 101 through an electrical connector 1013, the optical signal interface of the onboard optical assembly module 1071 is connected to an optical fiber interface unit 106 through an optical fiber 1063 and an optical connector 1062, and the optical fiber interface unit 106 then couples an optical signal of the optical connector 1062 to a cluster interface 1061 on a panel of the router through an optical fiber 1064. Through the foregoing series of connections, a signal coming from the packet processing module 1012 will finally arrive at the cluster interface 1061. Then the cluster interface 1061 of the line card chassis will be connected to a switch fabric unit of the central switch fabric chassis, or connected to a cluster interface of another line card chassis.

Signals of a cluster interface 1061 may come from a part of or all of packet processing modules 1012 of the line card chassis where the cluster interface 1061 is located.

The line card units 101 include packet processing modules 1012; to enable a signal of a packet processing module of a line card unit to arrive at a cluster interface, further, each cluster interface 1061 has signal transmission channels with all the packet processing modules 1012 in the line card chassis; and/or each packet processing module 1012 in the line card chassis has signal transmission channels with all the cluster interfaces 1061 in the line card chassis. Having a signal transmission channel means that a signal can be transmitted through a medium from a start point to a destination point, and the medium includes, but not limited to, packet processing module, printed board circuit, electrical connector, switch fabric chip module, optical-electrical conversion module, optical fiber, optical connector, etc.

According to embodiments of the present disclosure, signals of each cluster interface 1061 evenly come from all the packet processing modules 1012 of all the line card units 101 in the line card chassis 100. The cluster interfaces are used to concatenate respective chassis of the router, i.e., realizing clustering of the router by sacrificing a part of line card unit slots; and in case of there being a central switch fabric chassis, concatenating line card chassis and the central switch fabric chassis.

According to embodiments of the present disclosure, the optical connectors 1062 support plugging of the optical fiber interface units 106 and plugging of the optical-electrical conversion units 107.

According to embodiments of the present disclosure, the electrical connectors 1013 support plugging of the line card units 101 and also support plugging of the optical-electrical conversion units 107.

According to embodiments of the present disclosure, when a transmission distance is relatively far, on an electrical signal transmission path between an onboard optical assembly module 1071 and a line card unit 101, a signal conditioning circuit is added.

According to embodiments of the present disclosure, an optical connector 1062 may include multiple sub-interfaces and each sub-interface provides multi-cord optical fiber interconnection.

According to embodiments of the present disclosure, a cluster interface 1061 may include multiple sub-interfaces and each sub-interface provides multi-cord optical fiber interconnection.

Figure 4:
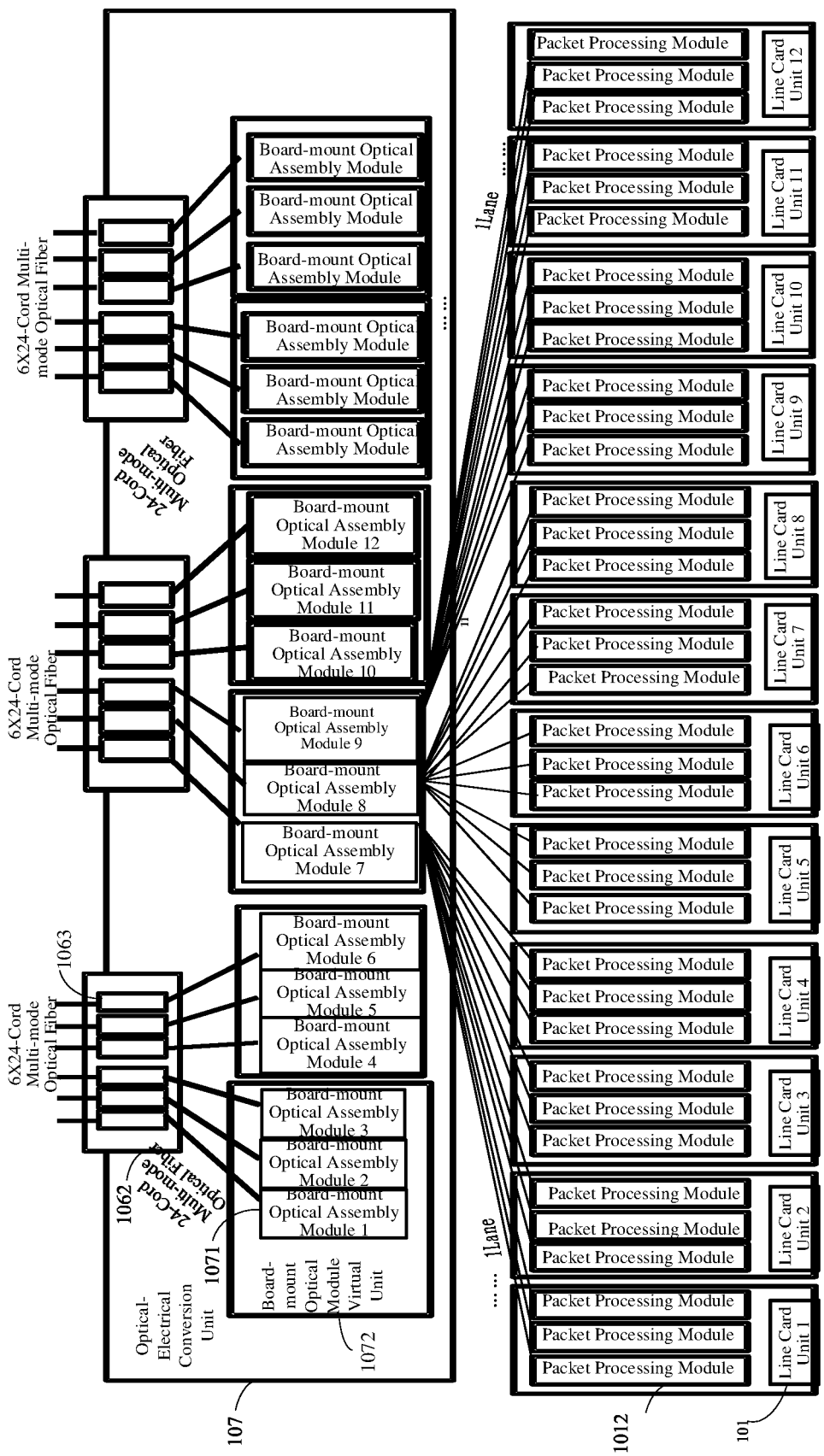
FIG. 4 is a schematic diagram showing how line card units and optical-electrical conversion units are connected provided according to examples of the present disclosure.

FIG. 4 is a schematic diagram showing how line card units and optical-electrical conversion units are connected provided according to embodiments of the present disclosure. Referring to FIG. 4, each packet processing module 1012 has link connections with all optical-electrical conversion units 107 in a line card chassis where the packet processing module 1012 is located, so that connected signals of each packet processing module 1012 are evenly allocated to all the optical-electrical conversion units 107 in the line card chassis where the packet processing module 1012 is located. Thus, loads of connections of the packet processing module 1012 are shared by all the optical-electrical conversion units 107, so that the system has redundancy, and when an optical-electrical conversion unit 107 fails, forwarding with a non-blocking wire-speed can be guaranteed.

To further facilitate understanding how the line card units 101 and the optical-electrical conversion units 107 are connected provided according to the embodiments of the present disclosure, detailed examples are provided in the following. Assume that a line card chassis includes 12 line card units 101, 6 optical-electrical conversion units 107, and 3 optical fiber interface units 106, in which each line card unit 101 is provided with 3 packet processing modules 1012, each packet processing module 1012 has 36 lanes of signals (36 transmitting signals and 36 receiving signals) to the optical-electrical conversion units 107, each optical-electrical conversion unit 107 is provided with 3 optical connectors 1062, each optical connector 1062 is provided with 6 sub-interfaces, each optical-electrical conversion unit 107 has 18 onboard optical assembly modules 1071, each onboard optical assembly module 1071 converts 12 lanes of signals (12 transmitting signals and 12 receiving signals) into 24-cord optical signals, each optical fiber interface unit 106 is provided with 12 cluster interfaces 1061, and each cluster interface 1061 is provided with 3 sub-interfaces.

As shown in FIG. 4, the packet processing modules 1012 have link connections with the 6 optical-electrical conversion units 107, so that the 36 lanes of signals of the packet processing modules 1012 are evenly allocated to the 6 optical-electrical conversion units 107, and each optical-electrical conversion unit 107 has 6 lanes of signals; the 18 onboard optical assembly modules 1071 are divided into 6 onboard optical module virtual units 1072, and each onboard optical module virtual unit 1071 has 1 lane of signal from each packet processing module 1012. That is, the 36 lanes of signals of each onboard optical module virtual unit 1072 come from the 36 packet processing modules 1012, i.e., each packet processing module 1012 providing 1 lane of signal to an onboard optical module virtual unit 1072.

Each onboard optical module virtual unit 1072 includes 3 onboard optical assembly modules 1071, and therefore each onboard optical module virtual unit 1072 converts 36 lanes of electrical signals into 72-cord optical signals and then connects the 72-cord optical signals to the optical connectors 1062, in which each optical connector 1062 is provided with 6 sub-interfaces 1063, each sub-interface 1063 is provided with a 24-cord multi-mode optical fiber. 72-cord multi-mode optical fiber signals of 3 sub-interfaces 1063 come from an onboard optical module virtual unit 1072 so that these signals are evenly respective 1 lane of signal from the 36 packet processing modules of the 12 line card units.

Figure 5:
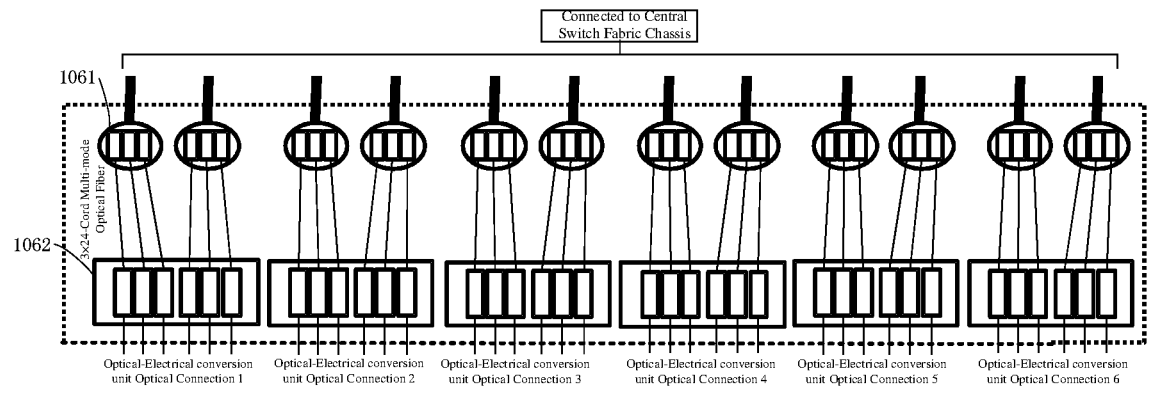
FIG. 5 is a schematic diagram showing how optical fiber interface units are connected provided according to examples of the present disclosure.

FIG. 5 is a schematic diagram showing how optical fiber interface units are connected provided according to embodiments of the present disclosure. Referring to FIG. 5, each cluster interface 1061 is provided with a 72-cord multi-mode optical interface (i.e., three 24-cord sub-interfaces) to be connected to 3 sub-interfaces of an optical connector 1062. Thus, 72-cord optical fiber signals (i.e., 36 lanes of signals) of the cluster interface 1061 evenly come from the 36 packet processing modules 1012 of the 12 line card units 101.

Figure 6:
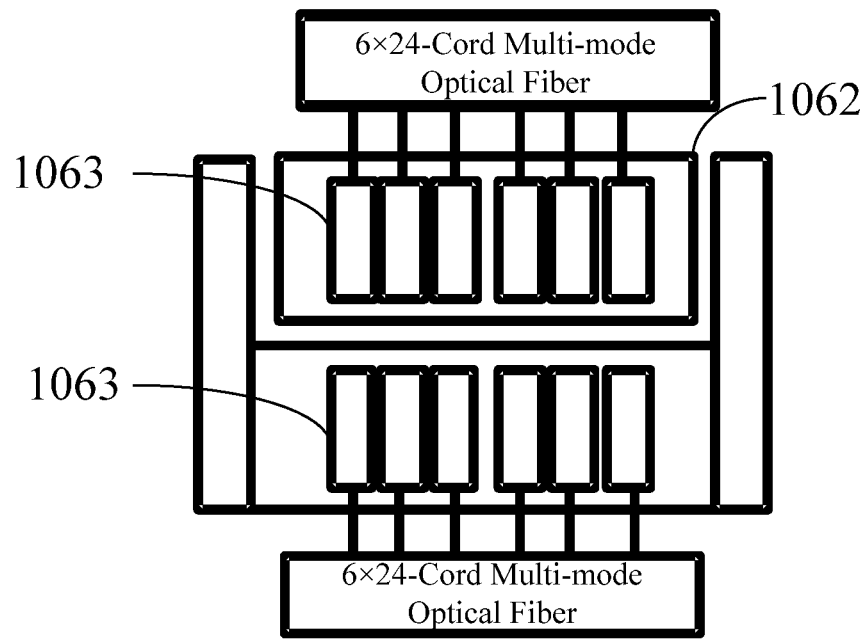
FIG. 6 is a schematic diagram showing an inner structure of an optical connector provided according to examples of the present disclosure.

FIG. 6 is a schematic diagram showing an inner structure of an optical connector provided according to embodiments of the present disclosure. Referring to FIG. 6, an optical connector 1062 includes multiple sub-interfaces 1063, and each sub-interface 1063 is provided with a multi-cord optical fiber connection. By using the multiple sub-interfaces, on one hand, a connection density of optical signals is improved, and on the other hand, difficulty in engineering and implementation of an optical connector is decreased. When an optical fiber interface unit 106 and an optical-electrical conversion unit 107 are plugged, the optical connector 1062 can protect a head of the optical fiber, i.e., protecting the optical connector having the sub-interfaces and the optical fiber from being damaged.

When the cluster interface 1061 uses multiple sub-interfaces, a connection density of optical signals can be improved, and difficulty in engineering and implementation of an optical connection of a sub-interface can be reduced; and on the other hand, the number of optical fibers between the line card chassis and the central switch fabric chassis can be reduced and engineering and wiring are easier to be implemented.

Figure 7:
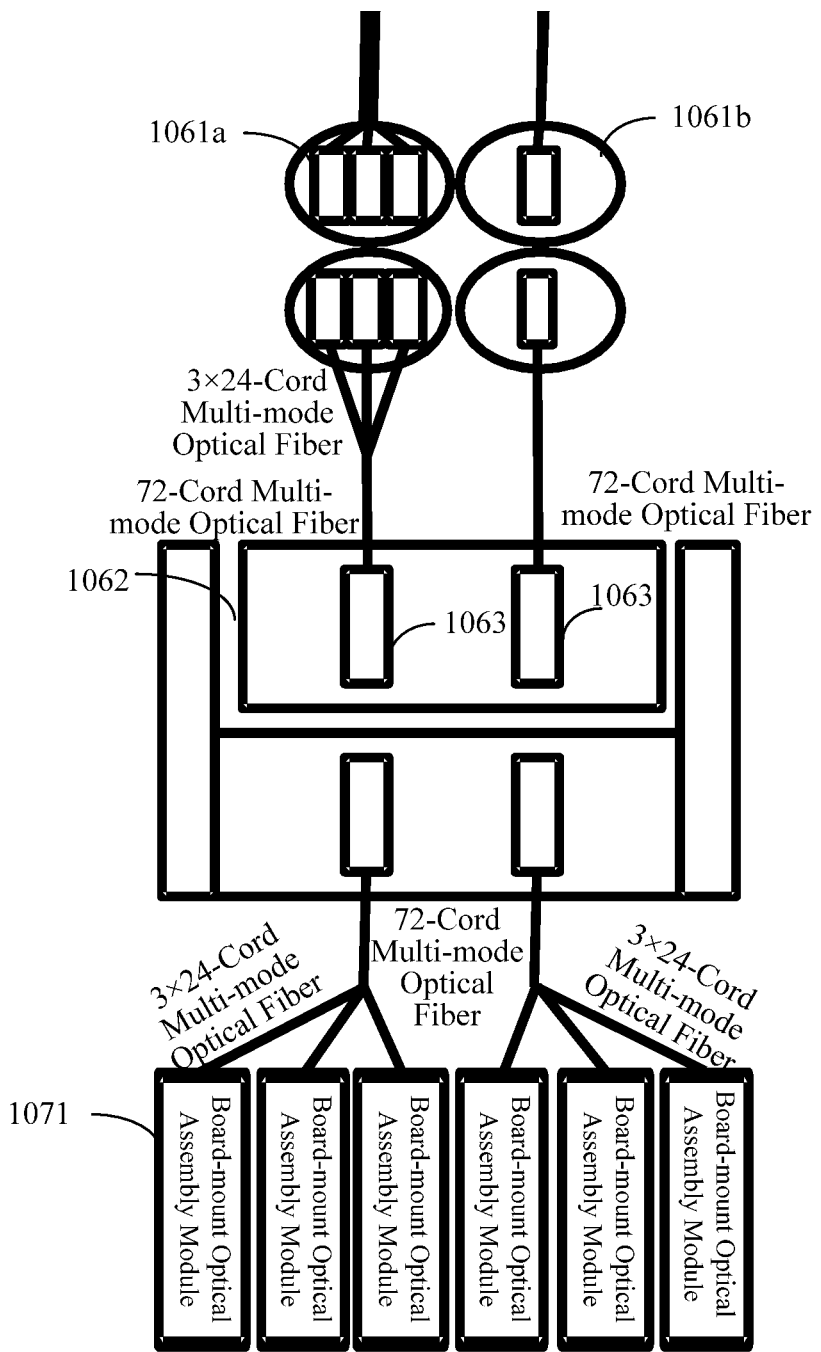
FIG. 7 is a schematic diagram showing inner structures of an optical connector and a cluster interface provided according to examples of the present disclosure.

According to embodiments of the present disclosure, optical fiber connectors and multi-cord breakout optical fibers with a higher density are used. As shown in FIG. 7, assuming that a sub-interface 1063 of the optical connector 1062 is a 72-cord optical interface and a sub-interface of a cluster interface 1061a is 24 cords, then a sub-interface of a cluster interface 1061b is 72 cords.

For a detailed implementation of optical connections between the optical connectors 1062 and the onboard optical assembly modules 1071, a solution is provided according to embodiments of the present disclosure, and the optical signal connections between the optical connectors 1062 and the onboard optical assembly modules 1071 are implemented by cross connections of optical fibers. According to an embodiment of the present disclosure, on a printed circuit board of an optical-electrical conversion unit 107, an onboard optical assembly module 1071 is deployed near a corresponding electrical connector 1013, so as to improve characteristics of a printed circuit board which has a complex connection deployment, more layers, a far transmission distance, a low electric signal quality, etc.

Figure 8:
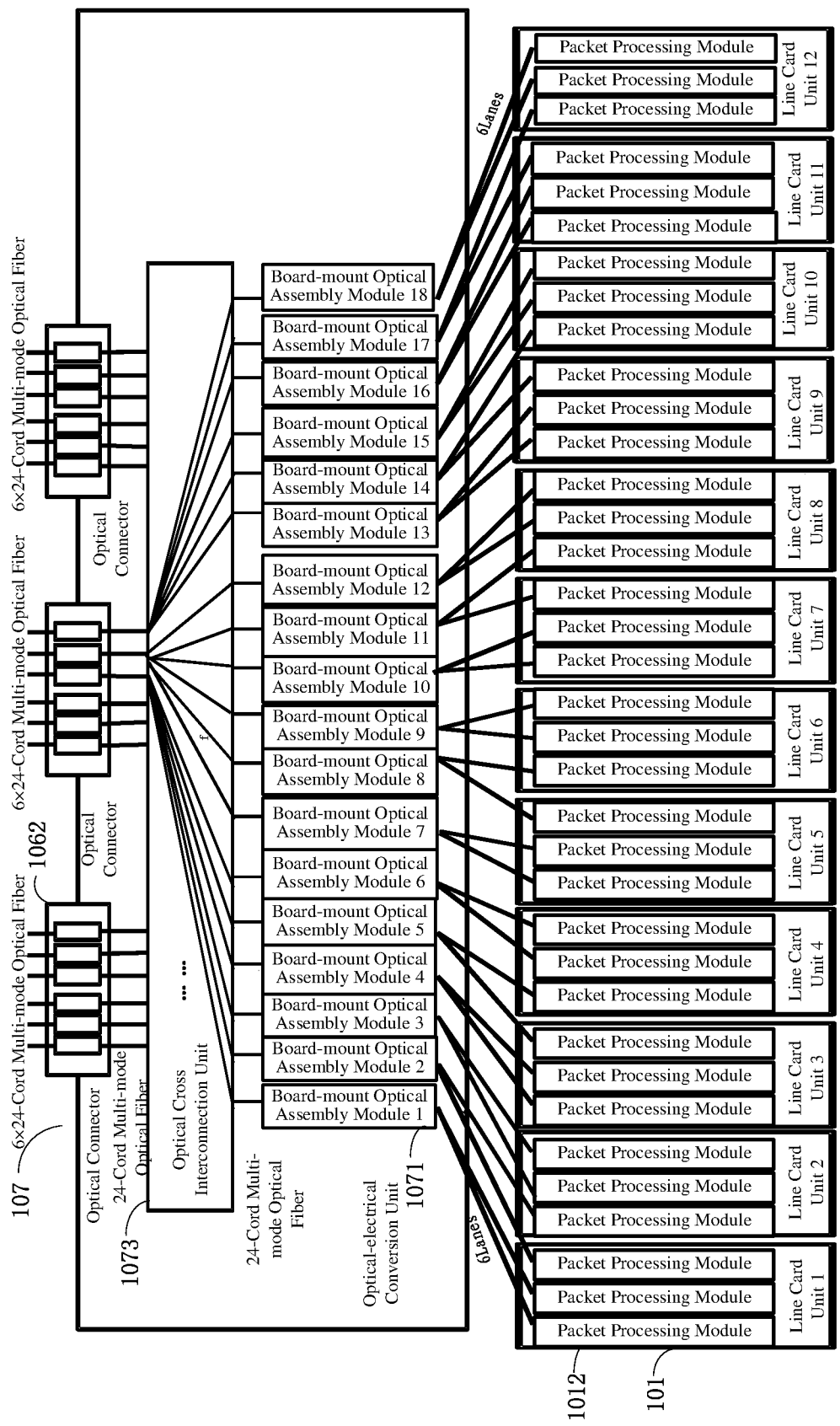
FIG. 8 is a schematic diagram showing how line card units and an optical-electrical conversion unit are connected provided according to examples of the present disclosure.

FIG. 8 is a schematic diagram showing how line card units and an optical-electrical conversion unit are connected provided according to embodiments of the present disclosure. Referring to FIG. 8, an optical cross interconnection unit 1073 is used to carry out optical signal connections between the onboard optical assembly modules 1071 and the optical connectors 1062, and finally 72-cord optical signals (36 lanes of signals) of cluster interfaces evenly come from 36 packet processing modules.

The optical cross interconnection unit 1073 may be implemented by a multi-cord breakout optical fiber or shuffle, and principles of implementing them are same, and both are connections through optical fibers, but physical media carried are different.

Figure 9:
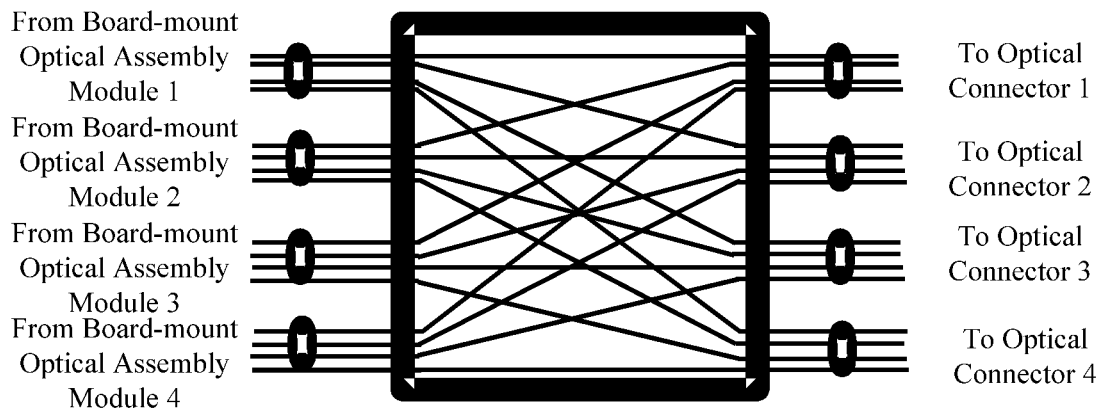
FIG. 9 is a schematic diagram of a 4*4 multi-cord optical fiber cross connection between onboard optical assembly modules and optical connectors provided according to examples of the present disclosure.

FIG. 9 is a schematic diagram of a 4*4 multi-cord optical fiber cross connection between onboard optical assembly modules and optical connectors provided according to embodiments of the present disclosure. Referring to FIG. 9, optical signals from different onboard optical assembly modules are connected to different optical connectors or sub-interfaces of the optical connectors through a jumper optical fiber mode. The jumper optical fiber mode refers to changing an ingress direction and an egress direction or changing a sequence of lines of signals at interfaces by inner connections of an optical fiber. For example, four optical fibers from an onboard optical assembly module 1 are respectively connected to an optical connector 1, an optical connector 2, an optical connector 3, and an optical connector 4.

In various embodiments of the present disclosure, a multi-chassis cluster router may use a multi-stage switching architecture.

A multi-chassis cluster router is provided according to embodiments of the present disclosure, including a central switch fabric chassis and line card chassis, in which the central switch fabric chassis and the line card chassis are connected through optical fibers using the line card chassis in the foregoing embodiments of the present disclosure.

The central switch fabric chassis is to carry out a route selection among different line card units within a same line card chassis and a route selection among different line card chassis.

Further, in the multi-chassis cluster router provided according to embodiments of the present disclosure, the central switch fabric chassis includes a first type of route selection units and a second type of route selection units; in which the second type of route selection units connect cluster interfaces and the first type of route selection units so as to carry out route selections from cluster interfaces in a same line card chassis to the first type of route selection units or from the first type of route selection units to the cluster interfaces; and the first type of route selection units are connected with the second type of route selection units to carry out route selections of the second type of route selection units among different line card chassis.

Figure 10:
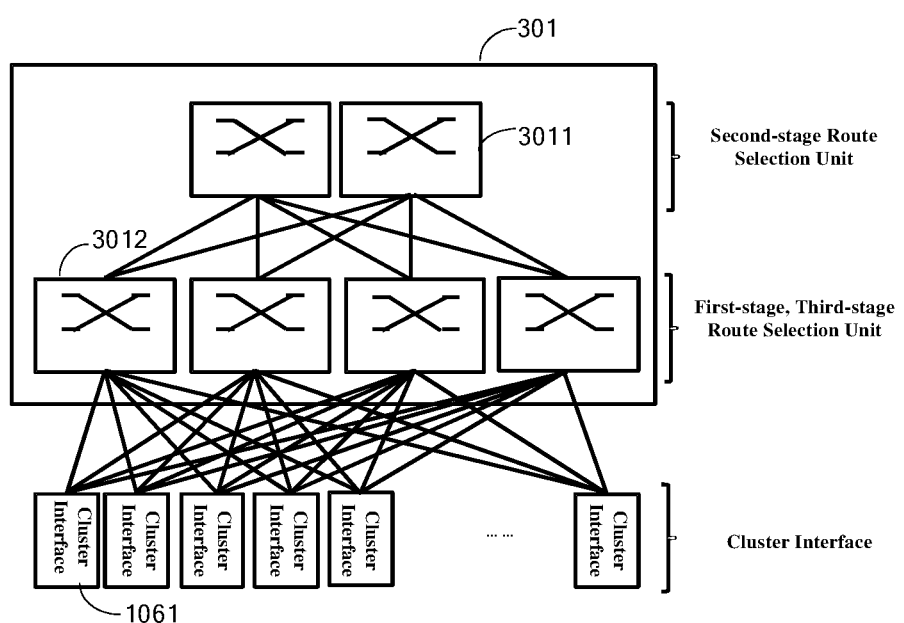
FIG. 10 is a functional block diagram of fabric switch units of a central switch fabric chassis provided according to examples of the present disclosure.

FIG. 10 is a functional block diagram of a switch fabric unit of a central switch fabric chassis provided according to embodiments of the present disclosure. Referring to FIG. 10, a switch fabric unit 301 provided according to an embodiment of the present disclosure includes second-stage route selection units 3011, first-stage route selection units 3012 and third-stage route selection units 3012. Among them, the first-stage route selection units 3012 and the third-stage route selection units 3012 are same in connection relationships and functions, but the first-stage route selection units are on an ingress direction, and the third-stage route selection units are on an egress direction, which are not differentiated hereinafter and are all called the second-type route selection units, and correspondingly, the second-stage route selection units 3011 become the first-type route selection units. Each first-stage or third-stage route selection unit 3012 is connected to each cluster interface 1061 and multiple second-stage route selection units 3011 in the line card chassis 100 so as to carry out a route selection from the cluster interface 1061 to the second-stage route selection unit 3011 or from the second-stage route selection unit 3011 to the cluster interface 1061. The second-stage route selection unit 3011 is connected with multiple first-stage and third-stage route selection units 3012 to carry out route selections between different first-stage and third-stage route selection units 3012.

Embodiments of the present disclosure provide a packet processing method, implemented on the foregoing multi-chassis cluster router, including the following steps:

a line card unit of an ingress line card chassis performs packet processing in a packet ingress direction, and transmits a packet to an optical-electrical conversion unit of the ingress line card chassis;

the optical-electrical conversion unit converts an electrical signal into an optical signal and transmits the optical signal to a central switch fabric chassis;

the central switch fabric chassis performs packet switching and an ingress interface of the central switch fabric chassis converts the optical signal into an electrical signal, and finds a destination line card chassis according to a header of the packet, an egress interface of the central switch fabric chassis converts the electrical signal into an optical signal and transmits the optical signal to the destination line card chassis;

an optical-electrical conversion unit of the destination line card chassis converts the optical signal into an electrical signal and transmits the electrical signal to a destination line card unit; and the destination line card unit performs packet processing in a packet egress direction and sends the packet.

Figure 11:
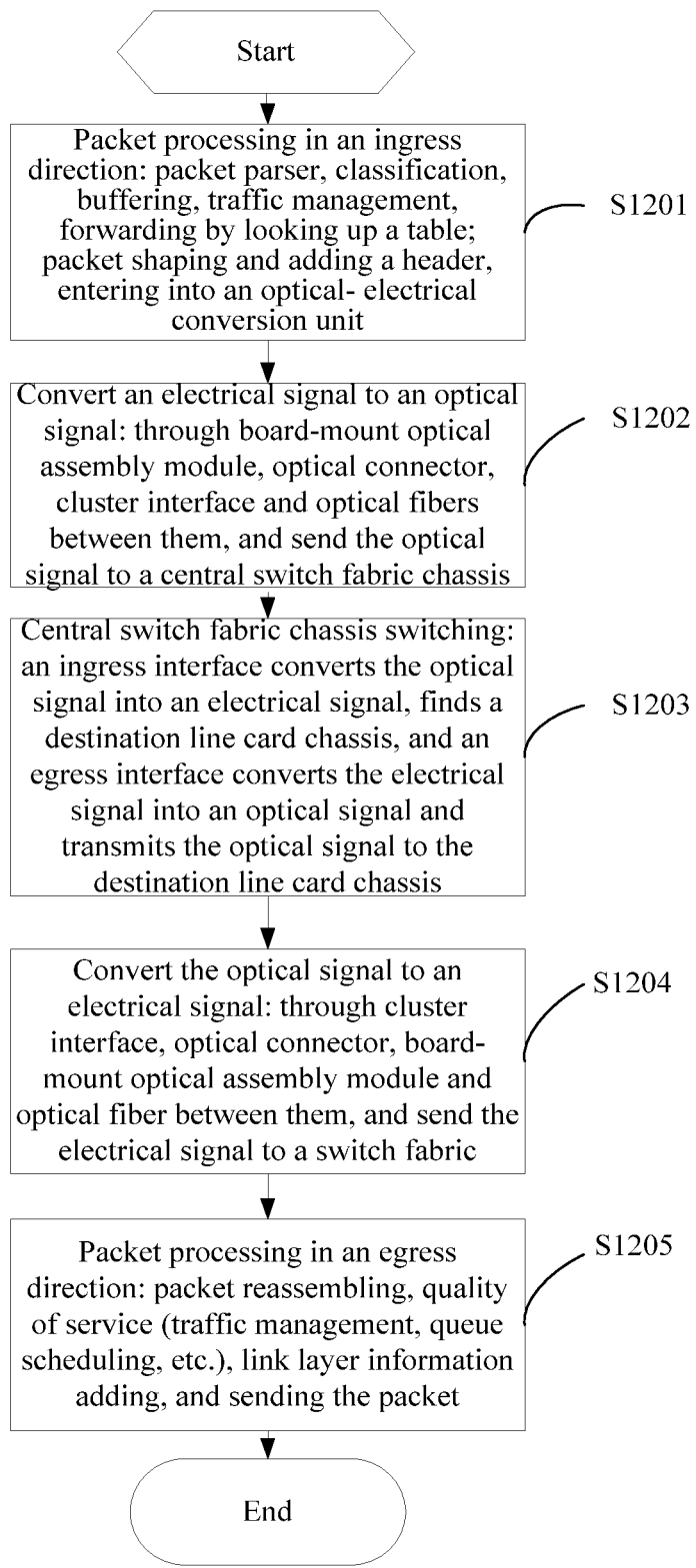
FIG. 11 is a flowchart of packet forwarding and processing of a multi-chassis cluster system provided according to examples of the present disclosure.

FIG. 11 is a flowchart of packet forwarding and processing in a multi-chassis cluster system provided according to embodiments of the present disclosure. Referring to FIG. 11, based on the multi-chassis cluster router provided according to FIG. 2 and FIG. 3, a packet processing flow provided according to another embodiment of the present disclosure includes:

block S1201: a line card unit 101 of the ingress line card chassis 100 performs packet processing in a packet ingress direction including packet parser, classification, buffering, traffic management, forwarding by looking up a table, packet shaping and attaching a header, and then transmits the packet to an optical-electrical conversion unit 107.

Block S1202: the optical-electrical conversion unit 107 converts an electrical signal into an optical signal through: an onboard optical assembly module, an optical connector, a cluster interface and optical fibers between them, and an optical fiber 400, and then transmits the optical signal to the central switch fabric chassis 300.

Block S1203: the central switch fabric chassis 300 performs packet switching: an ingress interface of the central switch fabric chassis 300 converts the optical signal into an electrical signal and finds a destination line card chassis 200 based on a header of the packet, an egress interface of the central switch fabric chassis 300 converts the electrical signal into an optical signal and transmits the optical single to the destination line card chassis 200.

Block S1204: an optical-electrical conversion unit 207 of the destination line card chassis 200 converts the optical signal into an electrical signal through: an optical fiber 500, and a cluster interface, an optical connector, an onboard optical assembly module and optical fibers between them in the destination line card chassis, and transmits the electrical signal to a destination line card unit 201, in which a line card unit corresponding to a destination network is the destination line card unit.

Block S1205: the line card unit that receives the electrical signal, i.e., the destination line card unit, performs packet processing in the packet egress direction, including: packet reassembling, quality of service (traffic management, queue scheduling, etc.), link layer information adding, and packet transmission.

It should be understood that, though the description is described based on respective embodiments, the way of describing is only for clarity purpose, and should not be construed as one embodiment including only an independent technical scheme. Those skilled in the art should deem the description as its entirety, and the technical schemes in the respective embodiments may be properly combined to form other implementations that can be understood by those skilled in the art.

What is described in the foregoing are only examples of the present disclosure, and should not be construed as limitation to the present disclosure. Any changes, equivalent replacements, modifications made without departing from the scope and spirit of the present disclosure are intended to be included within the protecting scope of the present disclosure.

The invention claimed is:

1. A line card chassis, wherein, the line card chassis comprises line card units, optical-electrical conversion units, optical fiber interface units, and a cluster interface; and
wherein a respective optical-electrical conversion unit has an onboard optical assembly module used for mutual conversion between an optical signal and an electrical signal; an electrical signal interface of the onboard optical assembly module is connected to a respective line card unit through an electrical connector to transmit the electrical signal, and an optical signal interface of the onboard optical assembly module is connected to a respective optical fiber interface unit through an optical connector to transmit the optical signal; and the respective optical fiber interface unit couples the optical signal to the cluster interface of a panel on a router through an optical fiber, and the cluster interface is to concatenate different chassis in the router.

2. The line card chassis of claim 1, wherein the line card units comprise packet processing modules; and
wherein a respective cluster interface has signal transmission channels with all the packet processing modules in the line card chassis; and/or a respective packet processing module in the line card chassis has signal transmission channels with all cluster interfaces in the line card chassis.

3. The line card chassis of claim 2, wherein the respective cluster interface has signal transmission channels with all the optical-electrical conversion units in the line card chassis; and/or the respective packet processing module in the line card chassis has signal transmission channels with all the optical-electrical conversion units in the line card chassis.

4. The line card chassis of claim 1, wherein the line card chassis further comprises fan units; and the line card chassis adopts a 3-level slot structure where a respective line card unit or a respective optical fiber interface unit occupies a first-level slot, a respective optical-electrical conversion unit occupies a second-level slot, and a fan unit occupies a third-level slot; and the respective line card unit and the respective optical-electrical conversion unit are connected using an orthogonal electrical connection without a back board, and the respective optical fiber interface unit and the respective optical-electrical conversion unit use an optical connection.

5. The line card chassis of claim 1, wherein, on an electrical signal transmission path from the onboard optical assembly module to the respective line card unit, a signal conditioning circuit is comprised.

6. The line card chassis of claim 1, wherein the respective optical-electrical conversion unit further comprises an optical cross interconnection module; and the optical cross interconnection module performs a connection for optical signals between the optical connector and the onboard optical assembly module.

7. The line card chassis of claim 6, wherein the optical cross interconnection module is a multi-cord breakout optical fiber or shuffle.

8. A multi-chassis cluster router, comprising a central switch fabric chassis and the line card chassis according to claim 1, and the central switch fabric chassis and the line card chassis are connected through optical fibers; and the central switch fabric chassis performs a first route selection among different line card units within a same line card chassis and performs a second route selection among different line card chassis.

9. The multi-chassis cluster router of claim 8, wherein the central switch fabric chassis comprises a first type of route selection units and a second type of route selection units; wherein the second type of route selection units connect cluster interfaces and the first type of route selection units to perform route selections from cluster interfaces in the same line card chassis to the first type route selection units or from the first type of route selection units to the cluster interfaces; and the first type of route selection units are connected with the second type of route selection units to perform route selections of the second type of route selection units among the different line card chassis.

10. A packet processing method, wherein the method is applied by the multi-chassis cluster router of claim 9, comprising the following steps:
performing, by a line card unit of an ingress line card chassis, packet processing in a packet ingress direction, and transmitting a packet to an optical-electrical conversion unit of the ingress line card chassis;
converting, by the respective optical-electrical conversion unit, the electrical signal into the optical signal, and transmitting the optical signal to the central switch fabric chassis;
performing, by the central switch fabric chassis, packet switching, and converting, by an ingress interface of the central switch fabric chassis, the optical signal into the electrical signal, and finding a destination line card chassis based on a header of the packet, and converting, by an egress interface of the central switch fabric chassis, the electrical signal into the optical signal and transmitting the optical signal to a destination line card chassis;
converting, by an optical-electrical conversion unit of the destination line card chassis, the optical signal into the electrical signal and transmitting the electrical signal to a destination line card unit; and performing, by the destination line card unit, packet processing in a packet egress direction and sending out the packet.

11. The multi-chassis cluster router of claim 8, wherein the line card units comprise packet processing modules; and
wherein a respective cluster interface has signal transmission channels with all the packet processing modules in the line card chassis; and/or a respective packet processing module in the line card chassis has signal transmission channels with all cluster interfaces in the line card chassis.

12. The multi-chassis cluster router of claim 11, wherein the respective cluster interface has signal transmission channels with all the optical-electrical conversion units in the line card chassis; and/or the respective packet processing module in the line card chassis has signal transmission channels with all the optical-electrical conversion units in the line card chassis.

13. The multi-chassis cluster router of claim 8, wherein the line card chassis further comprises fan units; and the line card chassis adopts a 3-level slot structure where a respective line card unit or a respective optical fiber interface unit occupies a first-level slot, a respective optical-electrical conversion unit occupies a second-level slot, and a respective fan unit occupies a third-level slot; and the respective line card unit and the respective optical-electrical conversion unit are connected using an orthogonal electrical connection without a back board, and the respective optical fiber interface unit and the respective optical-electrical conversion unit use an optical connection.

14. The multi-chassis cluster router of claim 8, wherein, on an electrical signal transmission path from the onboard optical assembly module to the line card unit, a signal conditioning circuit is comprised.

15. The multi-chassis cluster router of claim 8, wherein the respective optical-electrical conversion unit further comprises an optical cross interconnection module; and the optical cross interconnection module performs a connection for optical signals between the optical connector and the onboard optical assembly module.

16. The multi-chassis cluster router of claim 15, wherein the optical cross interconnection module is a multi-cord breakout optical fiber or shuffle.

\* \* \* \* \*